United States Patent [19]

Konishi et al.

[11] Patent Number: 5,014,199
[45] Date of Patent: May 7, 1991

[54] HEIGHT CONTROL SYSTEM IN AUTOMOTIVE SUSPENSION SYSTEM PREVENTIVE OF UNCOMFORTABLE HEIGHT ADJUSTMENT UPON ON-SET OF POWER SUPPLY

[75] Inventors: Junkichi Konishi; Yasuhiro Shiraishi, both of Kanagawa, Japan

[73] Assignee: Nissan Motor Company, Limited, Yokohama, Japan

[21] Appl. No.: 190,073

[22] Filed: May 4, 1988

[30] Foreign Application Priority Data

Jun. 13, 1987 [JP] Japan .............. 62-90971[U]

[51] Int. Cl.⁵ .............................. B60G 11/26
[52] U.S. Cl. .................. 364/424.05; 280/707; 280/DIG. 1; 180/41; 307/10.1
[58] Field of Search ........... 364/424.01, 424.05; 280/707, 6 H, DIG. 1; 180/41; 340/52 R

[56] References Cited

U.S. PATENT DOCUMENTS

| | | | |
|---|---|---|---|
| 4,033,423 | 7/1977 | Grosseau | 280/707 |
| 4,382,603 | 5/1983 | Senoo | 280/707 |
| 4,519,169 | 5/1985 | Smith | 51/241 S |
| 4,568,096 | 2/1986 | Yew et al. | 280/DIG. 1 |
| 4,593,920 | 6/1986 | Natsume et al. | 180/41 |
| 4,630,840 | 12/1986 | Masuda et al. | 180/41 |
| 4,659,104 | 4/1987 | Tanaka et al. | 280/707 |
| 4,696,483 | 9/1987 | Takizawa et al. | 280/6 |
| 4,700,303 | 10/1987 | Tokuyama et al. | 364/424.01 |
| 4,718,695 | 1/1988 | Kawagoe | 280/707 |
| 4,767,126 | 8/1988 | Bois et al. | 280/DIG. 1 |

FOREIGN PATENT DOCUMENTS

0114680 8/1984 European Pat. Off. .
0117700 8/1984 European Pat. Off. .

Primary Examiner—Parshotam S. Lall
Assistant Examiner—V. Trans
Attorney, Agent, or Firm—Foley & Lardner

[57] ABSTRACT

A vehicular height control system, according to the invention employs mutually different first and second target vehicular heights, about which normal vehicular height range is determined. The first target height is used during normal vehicle driving conditions, in which the power is supplied. On the other hand, the second target height is used during vehicular parking. The vehicular height control system according to the invention is responsive to turning OFF of the power supply to perform height adjustment utilizing the second target height to sligthly raise the vehicular height and maintains the raised height during parking. In order to maintain the vehicular height at a slightly higher level, slightly greater suspension force than that required for maintianing the vehicular height at a height level in the normal driving condition is provided. This reduces height adjustment when power supply is resumed.

17 Claims, 4 Drawing Sheets

HEIGHT CONTROL SYSTEM IN AUTOMOTIVE SUSPENSION SYSTEM PREVENTIVE OF UNCOMFORTABLE HEIGHT ADJUSTMENT UPON ON-SET OF POWER SUPPLY

BACKGROUND OF THE INVENTION

1. Field of the Invention

The present invention relates generally to a height control system for an automotive suspension system for adjusting or regulating a vehicular body height within a predetermined height range. More specifically, the invention relates to a vehicular height control system which can avoid the necessity of height adjustment upon ON-set of power supply.

2. Description of the Background Art

Various vehicular height control systems or height regulating systems have been developed and proposed. One of the known vehicle height control systems has been illustrated in the Japanese Patent First (unexamined) Publication No. 58-112817, published on July 5, 1983. In the shown vehicular height control system, relative height level of the vehicle body to suspension members are monitored and height control is performed with respect to each wheel position independently of other wheel positions. Such control is generally successful in regulating vehicular attitude.

Such height control systems are active for performing adjustment of the vehicular height while electric power supply is maintained. In order words, the suspension control system will be held inactive while the main power switch, e.g. ignition switch, is held OFF. Therefore, the vehicular height cannot be controlled while the vehicle is in a parking condition and thus the main power supply is held OFF. As will be understood, upon parking, the vehicular occupant or occupants will get off the vehicle to reduce the load on the vehicle. As a consequence, the force of the suspension system becomes excessive to rise the vehicular height across an acceptable higher vehicle height level. Since the main power supply is shut off at this vehicular height position, the vehicle may be held at extraordinary height position.

In order to avoid this, the Japanese Patent First (unexamined) Publication (Tokkai) Showa 55-47908 proposes a vehicular height control system which may perform height adjustment for a given period of time after shutting OFF the main power supply. The other vehicular height control system has been proposed in the Japanese Utility Model First Publication (Jikkai) Showa 59-121221. The disclosed system features height adjustment while the main power supply is held OFF, to adjust the height so as to maintain the vehicular height within a given normal height range when the vehicular height is higher than normal height range.

By the foregoing two prior proposed systems, vehicular height adjustment can be performed even after shutting OFF the main power supply to maintain the vehicular height within the predetermined normal height range. However, note is to be given that the height adjustment in the parking condition of the vehicle is performed under substantially no passenger's load condition. This means that the load condition at the vehicular parking position is held minimum. Since height adjustment is performed at minimum load condition, the suspension force to suspend the vehicle body on suspension systems natually becomes minimum.

At this position, when the vehicular occupant or occupants return to the vehicle and get therein, load is increased which tends to excessively lower the vehicular height level. Therefore, upon starting main power supply to make the vehicular height control system active in normal state, this lowered height position of the vehicle is sensed. As a result, height control may be performed to recover the vehicular height. This clearly degrades riding comfort.

Furthermore, since the pressure source unit including a pressurization pump, such as a compressor, is held inactive while the main power supply is OFF, substantial load may be exerted on the pressurization pump to shorten the life thereof. In addition, since the pressurization pump requires a period for raising pressure of working fluid, this period serves as a lag time in height adjustment. Therefore, it will take a relatively long period for raising the vehicular height within the normal height range.

SUMMARY OF THE INVENTION

Therefore, it is an object of the present invention to provide a vehicular height control system which may solve the defects in the prior proposed systems.

Another object of the invention is to provide a vehicular height control system which can avoid the necessity of height adjustment upon starting of the power supply.

In order to accomplish the aforementioned and other objects, a vehicular height control system, according to the invention employs mutually different first and second target vehicular heights, about which normal vehicular height range is determined. The first target height is used during normal vehicle driving contition, in which the power is supplied. On the other hand, the second target height is used during vehicular parking condition. The vehicular height control system according to the invention is responsive to turning OFF the power supply to perform height adjustment utilizing the second target height to slightly rise the vehicular height and maintains the rised height during parking condition.

In order to maintain the vehicular height at a slightly higher level, slightly greater suspension force than that required for maintaining the vehicular height at a height level in the normal driving condition, is provided. This may reduce the necessity of height adjustment when power supply is resumed. According to one aspect of the invention, a height control system for an automotive suspension system, comprises a suspension system disposed between a vehicle body and a suspension member rotatably supporting a road wheel, the suspension system including means for varying suspension force to be exerted between the vehicle body and the suspension member, a sensor monitoring a relative distance between the vehicle body and the suspension member for producing a height indicative sensor signal, and a controlling means, connected to an electric power source, for receiving the sensor signal, and checking the value of the sensor signal with respect to a predetermined value for deriving a control signal to operate the varying means to adjust the suspension force for maintaining the relative distance between the vehicle body and the suspension member, the controlling means being responsive to turning OFF of a power supply switch interposed between the electric power source and the controlling means, for increasing the predetermined value by a given magnitude to perform suspension control for a given period of time to control the relative distance at a height corresponding to the increased predetermined value.

According to another object of the invention a height control system for an automotive suspension system, comprises a suspension system disposed between a vehicle body and a suspension member rotatably supporting a road wheel, the suspension system including means for varying suspension force to be exerted between the vehicle body and the suspension member, a sensor monitoring a relative distance between the vehicle body and the suspension member for producing a height indicative sensor signal, and a controlling means, connected to an electric power source, for receiving the sensor signal, and checking the value of the sensor signal with respect to a predetermined first target height value for deriving a control signal to operate the varying means to adjust the suspension force for maintaining the relative distance between the vehicle body and the suspension member, the controlling means being responsive to turning OFF of a power supply switch interposed between the electric power source and the controlling means, for setting a second target height value which is greater than the first target height value in a given magnitude to perform suspension control for a given period of time to adjust the relative distance at the second target height.

According to a further aspect of the invention, a height control system for an automotive suspension system, comprises a suspension system disposed between a vehicle body and a suspension member rotatably supporting a road wheel, the suspension system including means for varying suspension force to be exerted between the vehicle body and the suspension member, a sensor monitoring a relative distance between the vehicle body and the suspension member for producing a height indicative sensor signal, a power source means including an ignition switch operable between ON and OFF to establish and block a main power supply, and a controlling means, connected to an electric power source, for receiving the sensor signal, and checking the value of the sensor signal with respect to a predetermined first target height value for deriving a control signal to operate the varying means to adjust the suspension force for maintaining the relative distance between the vehicle body and the suspension member, the controlling means being responsive to turning OFF of the ignition switch for setting a second target height value which is greater than the first target height value in a given magnitude to perform suspension control for a given period of time to adjust the relative distance at the second target height.

The controlling means preferably maintains operation for the given period of time after the distance is adjusted at the increased predetermined value corresponding height.

The varying means may comprise a hollow chamber communicated with a working fluid source to introduce and discharge working fluid in the hollow chamber for adjusting pressure of working fluid in the hollow chamber, which fluid pressure serves as the suspension force, and a pressure control valve disposed between the working fluid source and the hollow chamber for controlling introduction and discharging of working fluid into and from the hollow chamber for adjusting the suspension force and thereby adjusts the relative distance.

The height control system may further comprise an auxiliary power supply circuit by-passing the ignition switch, which includes a switching means operable between ON and OFF for establishing and blocking electrical communication through the auxiliary power supply circuit and is controller the switch position by the controlling means. The controlling means maintains the switching means at ON state for maintaining electrical coimmunication for the given period of time.

DESCRIPTION OF THE PREFERRED EMBODIMENT

Figure 1:
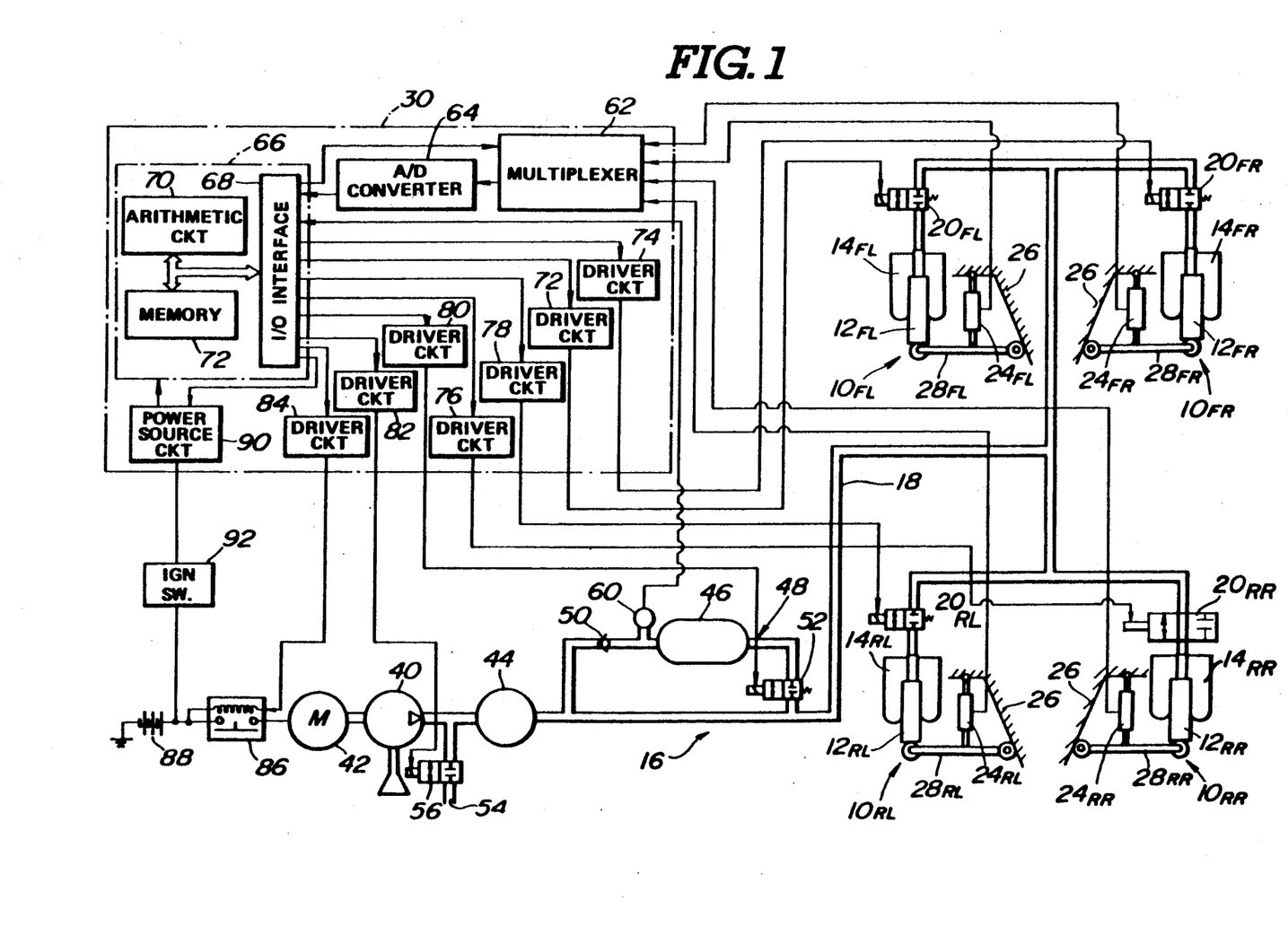
FIG. 1 is a block diagram of the preferred embodiment of a height control system in an automotive suspension system, according to the present invention.

Referring now to the drawings, particularly to FIG. 1, the preferred embodiment of a height control system in an automotive suspension system, according to the present invention, employs suspension system $10_{FL}$, $10_{FR}$, $10_{RL}$ and $10_{RR}$ for rotatably supporting front-left, front-right, rear-left and rear-right vehicular wheels. The suspension systems $10_{FL}$, $10_{FR}$, $10_{RL}$ and $10_{RR}$ include suspension struts $12_{FL}$, $12_{FR}$, $12_{RL}$ and $12_{RR}$ which include shock absorbers and height control actuator means $14_{FL}$, $14_{FR}$, $14_{RL}$ and $14_{RR}$.

The actuator means $14_{FL}$, $14_{FR}$, $14_{RL}$ and $14_{RR}$ generally comprise pressure chambers filled with a working fluid. In the preferred embodiment, the pressure chambers $14_{FL}$, $14_{FR}$, $14_{RL}$ and $14_{RR}$ are filled with gas, such as an air. Each of the pressure chambers $14_{FL}$, $14_{FR}$, $14_{RL}$ and $14_{RR}$ is connected to a pressurized air source 16 via pressure supply system 18. Height control valve means $20_{FL}$, $20_{FR}$, $20_{RL}$ and $20_{RR}$ are disposed within the pressure supply system 18 for controlling air pressure to be supplied for respectively corresponding pressure chambers $14_{FL}$, $14_{FR}$, $14_{RL}$ and $14_{RR}$. A height control valve means can be provided for commonly adjusting the air pressure in the pressure chambers $14_{RL}$, $14_{RR}$ of the rear suspension systems $10_{RL}$ and $10_{RR}$.

Height sensors $24_{FL}$, $24_{FR}$, $24_{RL}$ and $24_{RR}$ are provided at positions where the respective front-left, front-right, rear-left and rear-right suspension systems $10_{FL}$, $10_{FR}$, $10_{RL}$ and $10_{RR}$ are provided for monitoring relative height between vehicle body 26 and suspension members $28_{FL}$, $28_{FR}$, $28_{RL}$ and $28_{RR}$ which are connected to the vehicular wheels. Respective height sensors $24_{FL}$, $24_{FR}$, $24_{RL}$ and $24_{RR}$ produce vehicle height indicative signals $S_{FL}$, $S_{FR}$, $S_{RL}$ and $S_{RR}$. The vehicle height indicative signals $S_{FL}$, $S_{FR}$, $S_{RL}$ and $S_{RR}$ of the height sensors $24_{FL}$, $24_{FR}$, $24_{RL}$ and $24_{RR}$ are fed to a controller 30.

The controller 30 includes a discriminator stage and a control signal generator stage. The vehicle height indicative signals $S_{FL}$, $S_{FR}$, $S_{RL}$ and $S_{RR}$ are input to the discriminator stage of the controller. In the discriminator stage, each of the vehicle height indicative signals $S_{FL}$, $S_{FR}$, $S_{RL}$ and $S_{RR}$ is compared with a maximum height indicative upper criterion $H_U$ and a minimum height indicative lower criterion $H_L$ to discriminate whether the vehicle height as represented by the corresponding vehicle height indicative signal is within a target height range defined by the upper and lower criteria $H_U$ and $H_L$.

The upper and lower criteria $H_U$ and $H_L$ are determined in relation to or about a target vehicle height $H_{target}$. In practice, the upper and lower criteria $H_U$ and $H_L$ are defined with upper and lower acceptable height ranges centered at the target height $H_{target}$.

When the vehicle height level is out of the target height range, the control signal generator stage is triggered for operation. In response to initiation of the operation of the control signal generator stage, a communication valve control signal is, at first, output to a communication valve to open the latter. In response to the height control signal of the control signal generator stage, respective height control valve means $20_{FL}$, $20_{FR}$, $20_{RL}$ and $20_{RR}$ are operated to adjust the vehicle height level at respectively corresponding wheel positions to be within the target height range.

As shown in FIG. 1, the air source 16 comprises a compressed air supply network including a motor driven compressor 40 which is associated with an electric motor 42 to be driven by the driving force transmitted therefrom. The compressor 40 is connected to the pressure supply passage system 18. An air dryer 44 is disposed in the pressure supply passage system 18 and downstream of the compressor for drying the air fed from the compressor. In addition, a pressure accumulator 46 is provided in a pressure accumulation system 48 which is in communication with the pressure supply passage system 18 at both ends. A one-way check valve 50 is provided in the pressure accumulation system 48 and upstream of the pressure accumulator 46. An electromagnetically actuated pressure accumulation control valve 52 is provided downstream of the pressure accumulator 46.

The pressure supply passage system 18 includes a ventilation port 54, at which a ventilation control valve 56 is provided for opening and closing the port.

As seen from FIG. 1, the height control valves means $20_{FL}$, $20_{FR}$, $20_{RL}$ and $20_{RR}$ comprise electromagnetically actuated valves. The height control valves $20_{FL}$, $20_{FR}$, $20_{RL}$ and $20_{RR}$, the pressure accumulation control valve 52 and the ventilation control valve 56 are respectively connected to the controller 30 to be controlled to respective valve positions. The height control valves $20_{FL}$, $20_{FR}$, $20_{RL}$ and $20_{RR}$, employed in the shown embodiment, are so designed as to open while they are activated, to establish communication between the pressure chambers $14_{FL}$, $14_{FR}$, $14_{RL}$ and $14_{RR}$ and the pressure supply passage system 18 and to close while they are deactivated, to block the communication. The accumulation control valve 52 is so designed as to be activated to open for establishing communication between the pressure accumulator 46 and the pressure supply passage means 18 and to be deactivated to close for blocking the communication. The ventilation control valve 56 is designed to be activated to open the valve for exposing the pressure supply passage means 18 to the atmosphere for ventilation of the pressurized air through the ventilation port 54 and to be deactivated to shut the valve.

In order to monitor the pressure accumulated on the pressure accumulator 46, a pressure sensor 60 is provided. The pressure sensor 60 is designed for generating an accumulated pressure indicative signal to be input to the controller 30 as a compressor control parameter.

The height sensors $24_{FL}$, $24_{FR}$, $24_{RL}$ and $24_{RR}$, employed in the shown embodiment, comprise stroke sensors disposed between the vehicle body 26 and the suspension members $28_{FL}$, $28_{FR}$, $28_{RL}$ and $28_{RR}$. Each of the height sensors $24_{FL}$, $24_{FR}$, $24_{RL}$ and $24_{RR}$ monitors relative distance between the vehicle body and one of the corresponding suspension members $28_{FL}$, $28_{FR}$, $28_{RL}$ and $28_{RR}$ to output the height indicative signal $S_{FL}$, $S_{FR}$, $S_{RL}$ and $S_{RR}$. Each of the stroke sensors $24_{FL}$, $24_{FR}$, $24_{RL}$ and $24_{RR}$ may comprise an electrostatic capacity-type stroke sensor as shown in FIGS. 2 and 3, for example.

Figure 2:
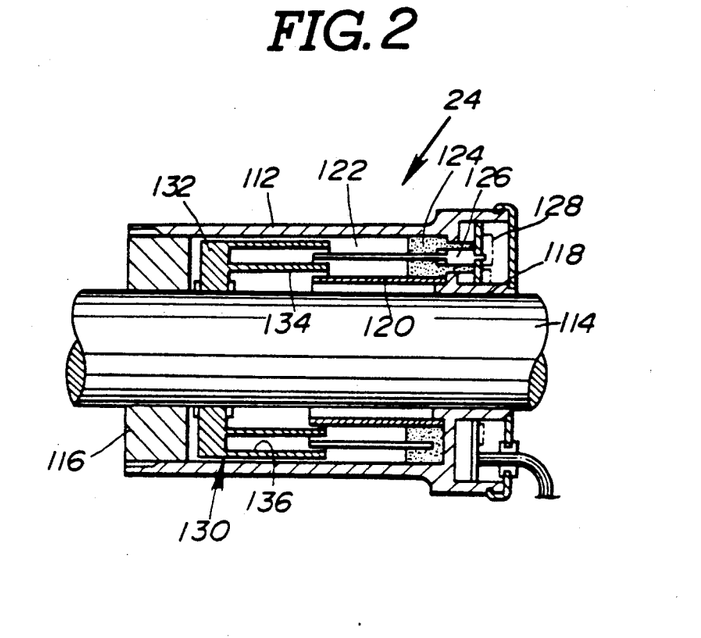
FIG. 2 is a partial and longitudinal section of one example of a vehicle height sensor to be employed the preferred embodiment of the vehicle height control system according to the invention.
Figure 3:
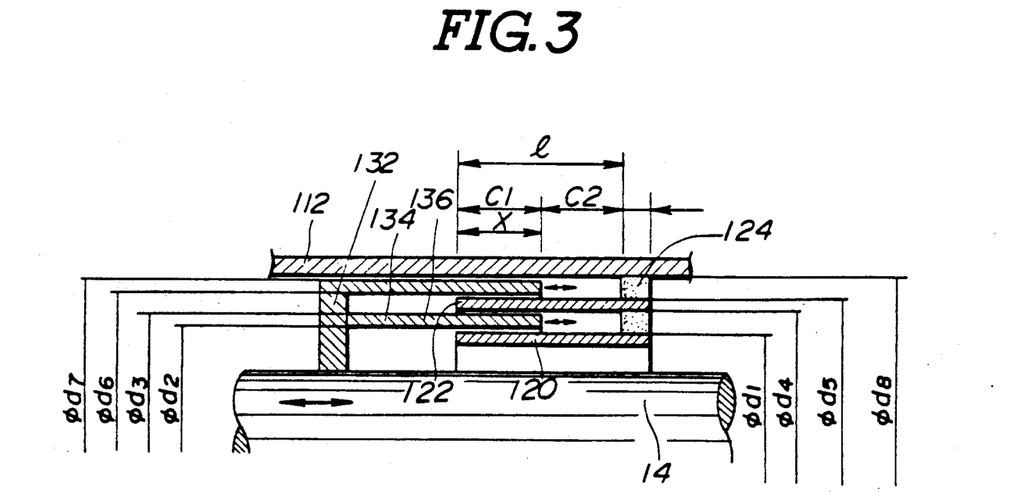
FIG. 3 is an enlarged section of the major part of the vehicle height sensor of FIG. 2.

As shown in FIGS. 2 and 3, the preferred example of the electrostatic capacity-type stroke sensor is generally represented by the reference numeral 24. The electrostatic capacity-type stroke sensor is designed for measuring relative stroke between a cylindrical member 112 and a rod member 114. In the shown construction, the rod member 114 is coaxially arranged through the cylindrical member 112 and thrustingly supported by means of supporting plug 116 and a cylindrical support section 118 integrally formed with the cylindrical member.

Both the cylindrical member 112 and the rod member 114 are made of electrically conductive material and, in turn, are electrically isolated from each other.

Inner and outer cylinders 120 and 122 are coaxially disposed between the cylindrical member 112 and the rod member 114. The cylindrical member 112, the outer cylinder 122, the inner cylinder 120 and the rod member 114 are coaxially arranged in spaced apart relationship and held in place by means of an annular support 124 which is made of an electrically insulative material.

The inner cylinder 120 is electrically connected to the cylindrical member 112 to constitute therewith a grounding electrode. On the other hand, the outer cylinder 122 is connected to a terminal 126 which is, in turn, connected to a sensor circuit 128. In the shown embodiment, the sensor circuit 128 comprises a RC oscillator. The outer cylinder 122 is designed to function as positive electrode. The sensor circuit 128 is also connected to the grounding electrode formed by the inner cylinder 120 and the cylindrical member 112 to be grounded therethrough.

With the plug 116, the cylindrical supporting section and the insulative support 124 establishes gas tight seal. A gaseous state dielectric material which has a stable dielectric constant is provided in the enclosed space.

On the other hand, a dielectric member 130 is provided for movement with the rod member 114. The dielectric member comprises a radially extending disk-shaped section 132 and coaxially arranged inner and outer cylindrical sections 134 and 136. The inner diameter $\phi d_2$ of the inner cylindrical section 134 of the dielectric member 130 is greater than the outer diameter $\phi d_1$ of the inner cylinder 120 and the outer diameter $\phi d_3$ is smaller than the inner diameter $\phi d_4$ of the outer cylinder 122 so that the inner cylindrical section 134 may enter into the annular space defined between the inner and outer cylinders 120 and 122, as shown in FIG. 3. On the other hand, the inner diameter $\phi d_6$ of the outer cylindrical section 136 is greater than the outer diameter $\phi d_5$ of the outer cylinder 122 and the outer diameter $\phi d_7$ is smaller than the inner diameter $\phi d_8$ of the cylindrical member 112 so that the outer cylindrical section may enter into the annular space defined between the outer cylinder 122 and the cylindrical member. On the other hand, the disk-shaped section 132 is rigidly fixed to the outer periphery of the rod member 114 so that the dielectric member 130 may be moved according to movement of the rod member 114.

With the construction set forth above, electrostatic capacity Ct is created between the inner and outer cylinders 120 and 122 and the inner and outer cylindrical sections 134 and 136 of the dielectric member 130 while relative displacement between the cylindrical member 112 and the rod member 114 occurs.

Here, assuming the possible maximum relative stroke between the cylindrical member 112 and the rod member 114 is l, is as shown in FIG. 3; the relative dielectric constant of the dielectric member is $e_2$; and the relative dielectric constant of the gaseous dielectric material is $e_1$. It is further assumed that the electrostatic capacity of overlapping portion between the inner and outer cylindrical sections 134 and 136 and the inner and outer cylinders 120 and 122 is $C_1$; the electrostatic capacity of the portions of the inner and outer cylinders 120 and 122 outside of the inner and outer cylindrical sections 134 and 136 is $C_2$; and the electrostatic capacity of the portion where the inner and outer cylinders 120 and 122 are supported is $C_3$. In this case, the electrostatic capacities $C_t$, $C_1$ and $C_2$ can be respectively illustrated by the following equations:

$$C_t = C_1 + C_2 + C_3 \quad (1)$$

$$C_1 = 2e_0 x [1/\{(1/e_2 - 1/e_1) ln.d_3/d_2 + 1/e_1.lnd_4/d_1\} + \{1/(1.e_2 - 1/e_1) ln.d_7/d_6 + 1/e_1.lnd_8/d_5\}] \quad (2)$$

$$C_2 = 2e_0(1-x).[1/\{(1-e_1) ln(d_4/d_1)\} + 1/\{(1-e_1) ln(d_8/d_5)\}] \quad (3)$$

where $e_0$ is dielectric constant in vacuum
Here, it is assumed:

$$[1/\{(1/e_2 - 1/e_1) ln.d_3/d_2 + 1/e_1.lnd_4/d_1\} + \{1/(1/e_2 - 1/e_1) lnd_7/d_6 + 1/e_1.lnd_8/d_5\}] = A;$$

and $$[1/\{(1-e_1) 1 n(d_4/d_1)\} + 1/\{(1-e_1) ln(d_8/d_5)\}] = B$$

A and B are both constant. The equations (2) and (3) can be modified utilizing A and B, and the electrostatic constant Ct can be illustrated by:

$$C_t = 2e_0 x(A-B) + 2e_0 lB + C_3 \quad (4)$$

As will be appreciated herefrom, the electrostatic constant Ct is variable in proportion to the stroke x.

As set forth, the detector circuit comprises the RC oscillator whose oscillation cycle period can be described by:

$$T = (1/K) RC \quad (5)$$

where K is constant.

From this the frequency output characteristics of the RC oscillator can be described by:

$$T = (R/K) 2e_0 x(A-B) + C_0 \quad (6)$$

where $$C_0 = 2e_0 lB + C_3$$

As will be appreciated from the foregoing equations, the frequency oscillation cycle period T is proportional to the relative displacement stroke x. Therefore, by monitoring the frequency oscillation cycle period T, the stroke x can be detected.

Here, the diameters $\phi d_1$ through $\phi d_8$ can be varied depending upon the temperature of the atmosphere due to thermal expansion. Among those variable dimensions, the radios $\phi d_3/\phi d_2$ and $\phi d_7/\phi d_6$ are regarded constant despite various rates of thermal expansions. Similarly, the radios $\phi d_4/\phi d_1$ and $\phi d_8/\phi d_5$ are regarded constant.

On the other hand, the dielectric constants $e_1$ and $e_2$ of the gaseous dielectric material filled in the space defined in the cylindrical member and the dielectric member 130 can be made substantially constant at any temperature range by appropriately selecting the materials. For example, the dielectric material which exhibits a stable dielectric constant in relation to temperature variation may be selected among air or resin, such as polyacetal resin or polypropylene resin. Therefore, as the gaseous dielectric material, the air may be used in the preferred embodiment so as to avoid influence of the temperature variation and to obtain a stable dielectric constant thereof.

However, as the dielectric material for forming the dielectric member 130, a material which can provide higher resolution in measurement of the relative stroke between the rod member and the cylindrical member, is preferred. In order to obtain higher resolution, greater electrostatic capacity to be established becomes necessary. This, in turn, requires a higher dielectric constant of the dielectric material forming the dielectric member 130. A satisfactory high dielectric constant is obtainable by utilizing inorganic material, such as mica. Such inorganic material is known to have a substantially high dielectric constant but is know as expensive material and as difficult material for machining and/or mass-production. On the other hand, synthetic resins are less expensive and easy for forming a desired shape. However, a synthetic resin generally has a low or insufficient dielectric constant as required for the stroke sensor of the type disclosed hereabove.

In this view, the preferred embodiment of the stroke sensor, according to the present invention, employs a composite dielectric material which is a composition of the synthetic resin material and inorganic material. As a resin material to form the composition, thermoplastic resin, such as polypropylene, polyacetal, polybuthylene terephtalate, polyphenylene sulfide and so forth are preferred in view of solubility with the inorganic material. As inorganic material, ceramics are used.

Each of the stroke sensors $24_{FL}$, $24_{FR}$, $24_{RL}$ and $24_{RR}$ are connected to the controller 30 via a multiplexer 62 and an analog-to-digital (A/D) converter 64. On the other hand, the controller 30 comprises a microprocessor 66 having an input/output interface 68, an arithmetic circuit 70, such as a CPU, and a memory 72, such as a ROM, RAM, register and so forth. The input/output interface 68 is connected to the A/D converter to receive one of the height indicative signals from the corresponding one of the stroke sensors $24_{FL}$, $24_{FR}$, $24_{RL}$ and $24_{RR}$ as selected by the multiplexer 62. The multiplexer 62, is designed to receive a clock signal output from the microprocessor to select one of the height indicative signals in a given order and at a given timing.

The input/output interface 68 is also connected to driver circuits 72, 74, 76, 78, 80, 82, and 84 to feed thereto control signals.

The driver circuits, 72, 74, 76 and 78 are respectively connected to the height control valves $20_{FL}$, $20_{FR}$, $20_{RL}$ and $20_{RR}$ to feed thereto height control driver signals. The driver circuits 72, 74, 76 and 78 output HIGH level height control driver signals when the height level of respectively corresponding vehicle body portions is out of the target height range and, otherwise, output LOW level height control driver signals. Therefore, the height control valves $20_{FL}$, $20_{FR}$, $20_{RL}$ and $20_{RR}$ are responsive to the HIGH level height control signal to be activated and to the LOW level height control signal to be deactivated. Furthermore, the driver circuit 80 is connected to the pressure accumulation control valve 52 to feed a HIGH level accumulator control signal to open the latter for establishing communication between the pressure accumulator 46 and the pressure supply system 18 and to feed a LOW level accumulator control signal to close the latter for blocking the communication.

The driver circuit 82 is connected to the ventilation control valve 56 to open the valve in order to expose the pressure supply system 18 to the atmosphere by a HIGH level ventilation control signal and to shut for closing the pressure supply system.

In addition, the microprocessor 66 detects the pressure in the pressure accumulator 46 dropping lower than a predetermined pressure to generate a compressor control signal. The compressor control signal is fed to a driver circuit 84 via the input/output interface 68. The driver circuit 84 is connected to a power supply control relay 86 which establishes and blocks electric connection between the electric motor 42 and a vehicular battery 88. In response to the compressor control signal, the driver circuit 84 produces a compressor drive signal for energizing the power supply control relay 86 for establishing electric connection between the battery 88 and the motor 42 to drive the motor. As a result, the compressor 40 is driven by the driving force of the motor 42 to supply the pressure to the pressure accumulator 46.

In the shown embodiment, the microprocessor 66 of the controller 30 is further connected to a power source circuit 90 to receive electric power therethrough. The power source circuit 90 is, in turn, connected to the vehicular battery 88 via an ignition switch 92 to receive electric power therefrom.

It should be noted that, as is well known, the ignition switch 92 may be operated between LOCK position in which steering lock device is active to lock a vehicular steering, OFF position where electric power supply is off, ACC position in which electric power is supplied to electric equipment in the vehicle but is not supplied to an ignition system, IGN position in which the electric power is supplied not only to the electric equipment but also to the ignition system, and START position in which the electric power is supplied to the ignition system and a starter motor and is not supplied to the electric equipment. However, in order to simplify the following discussion, any ignition switch position in which power supply for the microprocessor 66 is established will be referred to as "ON" position and any ignition switch position in which power supply for the microprocessor 66 is blocked will be referred to as "OFF" position. In addition, though FIG. 1 does not show clearly, the ignition switch 92 may also control power supply for the power supply control relay 86 to operate the relay switch therein between conductive state and non-conductive state so that electric power may be supplied to the motor 42 only when the ignition switch 92 is held at ON position.

Figure 4:
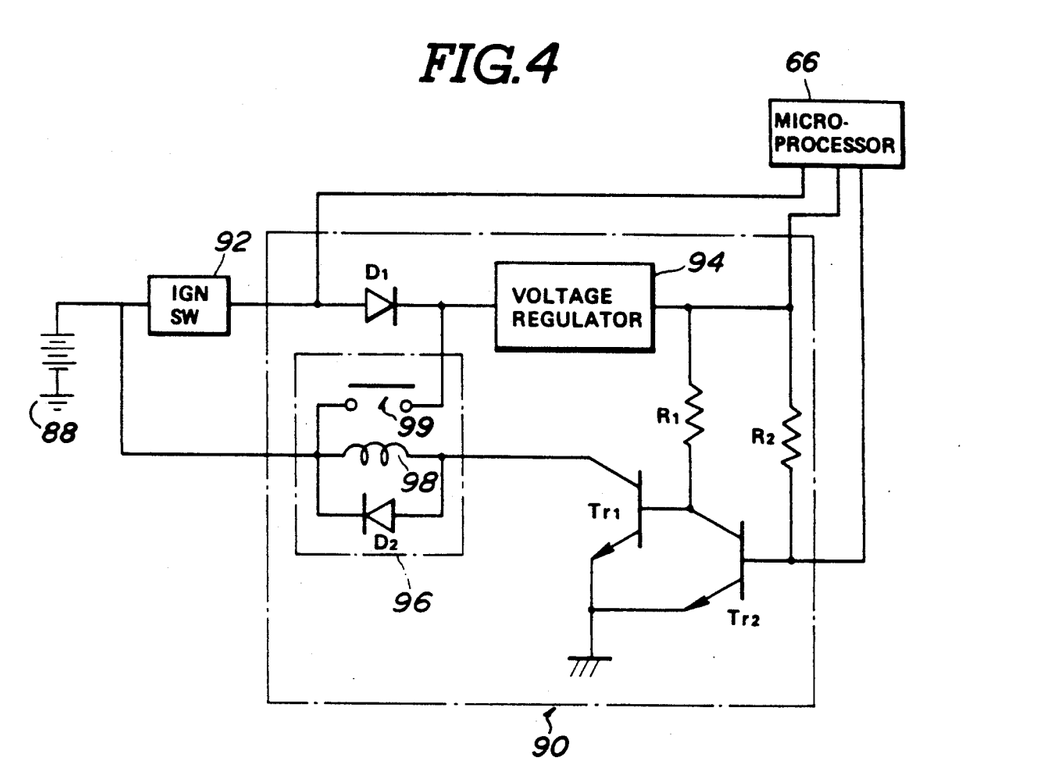
FIG. 4 is a circuit diagram of a power source circuit to be employed in the preferred embodiment of the vehicular height control system of FIG. 1.

FIG. 4 shows the detailed contruction of the power source circuit 90. The power source circuit 90 includes a voltage regulator circuit 94 which is connected to the battery 88 via the ignition switch 92 and a diode $D_1$. The voltage regulated output of the voltage regulator circuit 94 s supplied to the microprocessor 66 as driving power thereof. The power source circuit 90 further includes a self-holding relay unit 96. The self-holding relay unit 96 includes a self-holding relay coil 98. One terminal of the self-holding relay coil 98 is connected to the vehicular battery 88 via a circuit by-passing the ignition switch 92. The self-holding relay unit 96 also includes a normally open relay switch 99. This normally open relay switch 99 is disposed in parallel to the series circuit of the ignition switch 92 and the diode $D_1$. The self-holding relay unit 96 additionally includes a diode $D_2$ which absorbs surge voltage of the self-holding relay coil 98.

The other terminal of the self-holding relay coil 98 is connected to a collector electrode of a transistor $Tr_1$. The base electrode of the transistor $Tr_1$ is connected to the output of the voltage regulator circuit 94 via a resistor $R_1$ and, in turn, to the collector electrode of a transistor $Tr_2$. The emitter electrodes of the transistors $Tr_1$ and $Tr_2$ are commonly grounded. On the other hand, the base electrode of the transistor $Tr_2$ is connected to the output of the voltage regulator circuit 94 via a resistor $R_2$. The base electrode of the transistor $Tr_2$ is also connected to the interface 68 of the microprocessor 66 in order to receive therefrom a self-holding control signal. The self-holding control signal of the microprocessor 66 is held LOW (0) while the ignition switch 92 is held ON and thus power supply to the voltage regulator circuit 94 is established. At this position, the transistor $Tr_2$ is held OFF (non-conductive) to apply ON bias to the base electrode of the transistor $Tr_1$. Therefore, the transistor $Tr_1$ is maintained at ON position. Therefore, the electric power from the battery 88 may flow through the self-holding relay coil 98 and the transistor $Tr_1$. As a result, the self-holding relay coil 98 is held energized to maintain the relay switch 99 at the closed position. By this self-holding circuit connecting the battery 88 and the voltage regulator circuit 94 by-passing the ignition switch 92 is established.

The microprocessor 66 maintains the self-holding control signal at LOW level for a given period of time after the ignition switch 92 is turned OFF. By this, power supply to the voltage regulator circuit 94 from the battery 88 via the self-holding circuit is maintained for the given period corresponding to the period of time in which the self-holding control signal is held LOW level.

After expiration of the given period of time after turning OFF the ignition switch 92, the microprocessor 66 switches the level of the self-holding control signal from LOW level to HIGH level. By this, the transistor $Tr_2$ is turned ON to turn OFF the transistor $Tr_1$. Therefore, electric current is blocked to flow through the relay coil 98. This deenergizes the relay coil 98. As a result, the relay switch 99 is returned to the normal open position to break the self-holding circuit. This terminates power supply to the voltage regulator circuit 94.

In the preferred embodiment of the vehicular height control system, the microprocessor is set with two different target heights. One of the target heights $H_N$ is used while the ignition switch 92 is held ON. The target height $H_N$ will be hereafter referred to as "normal target height". On the other hand, the other target height $H_P$ is used in the period of time after turning OFF of the ignition switch 92 and in which the self-holding control signal is held LOW. This given period of time will be hereafter referred to as "OFF-set period". The target height $H_P$ will be hereafter referred to as "OFF-set target height". This OFF-set target height $H_P$ is set higher than the normal target height $H_N$.

Practical height control in the preferred embodiment of the vehicular height control system will be discussed herebelow with reference to FIG. 5.

Figure 5:
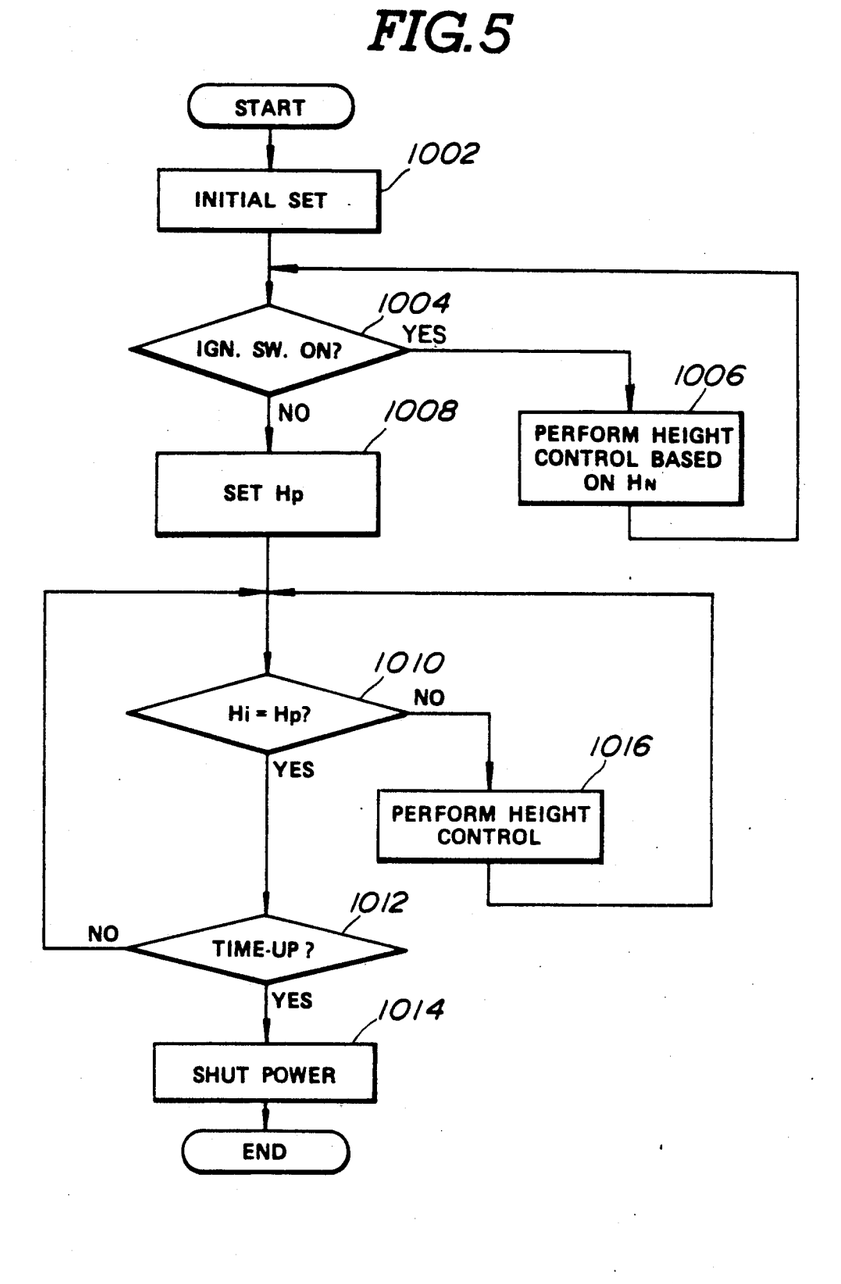
FIG. 5 is flowchart showing a sequence of a vehicle height control program for controlling the height position of a vehicle body relative to a suspension member.

FIG. 5 shows a flowchart of the vehicle height control program to be executed by the microprocessor 66. In addition, a height adjustment program may be performed to check vehicular height with respect to one of the height indicative signals $S_{FL}$, $S_{FR}$, $S_{RL}$ and $S_{RR}$ selectively and alternatively input via the multiplexer 62. Therefore, height adjustment operation is to be performed with respect to one of the suspension systems $10_{FL}$, $10_{FR}$, $10_{RL}$ and $10_{RR}$ corresponding to the one of the height indicative signals $S_{FL}$, $S_{FR}$, $S_{RL}$ and $S_{RR}$ processed in the execution cycle.

Immediately after starting execution, the system is initialized. In the initialization process, the normal target height $H_N$ is selected for succeeding height control, at a step 1002. At the same time, all of the control signals to be output from the interface 68 of the controller 30 are set to LOW (0). By setting the control signals LOW, the height control valves $20_{FL}$, $20_{FR}$, $20_{RL}$ and $20_{RR}$, the accumulation control valve 52, and the ventilation control valve 56 are held to closed position, and the motor drive relay 86 is deenergized. In addition, by the LOW level self-holding control signal, the self-holding relay coil 98 is energized to close the self-holding relay switch 99. Therefore, the self-holding circuit is established.

At a step 1004, the switch position of the ignition switch 92 is checked. When the ignition switch 92 is ON, vehicular height control is performed utilizing the normal target height $H_N$, at a step 1006. While the ignition switch 92 is held ON, the steps 1004 and 1006 are repeatedly and cyclically performed for continuous height adjustment. In the practical control, each of the vehicular height indicative signals $S_{FL}$, $S_{FR}$, $S_{RL}$ and $S_{RR}$ is compared with the upper and lower height criteria $H_U$ and $H_L$ determined with respect to the normal target height $H_N$. Namely, when the vehicular height indicative signal is smaller than the lower height criterion $H_L$, UP command is issued. The microprocessor 66 is then responsive to the UP command to check the pressure in the pressure accumulator 46. When the pressure in the pressure accumulator 46 is sufficiently high to increase the pressure in the corresponding one of pressure chambers $14_{FL}$, $14_{FR}$, $14_{RL}$ and $14_{RR}$, the control signal is fed to the accumulation control valve 52 to open. On the other hand, when the fluid pressure in the pressure accumulator 46 is not sufficient, the microprocessor 66 outputs HIGH level control signal to the relay 86 to drive the pump motor 42 to drive compressor 40. Simultaneously, HIGH level control signals are fed to a corresponding one of the height control valves $20_{FL}$, $20_{FR}$, $20_{RL}$ and $20_{RR}$. On the other hand, when the height indicative signal value is greater than the upper height criterion $H_U$, DOWN command is produced. The microprocessor 66 is responsive to this DOWN command to output a ventilation control signal to open the ventilation control valve 56. Also, a control signal is fed to one of the height control valves $20_{FL}$, $20_{FR}$, $20_{RL}$ and $20_{RR}$ to open to reduce the fluid pressure in a corresponding one of the pressure chambers $14_{FL}$, $14_{FR}$, $14_{RL}$ and $14_{RR}$.

On the other hand, when OFF position of the ignition switch 92 is detected at the step 1004, it means that the instantaneous vehicular height control system is in the OFF-set period. Therefore, process goes to a step 1008. At the step 1008, the OFF-set target height $H_P$ is set. Then, the vehicular height indicative signal value is compared with the OFF-set target height $H_P$ at a step 1010. When the vehicular height indicative signal value is different from the OFF-set target height $H_P$, UP or DOWN command is reduced to perform height adjustment, at a step, 1016. The steps 1010 and 1016 are repeatedly executed until the vehicular height is adjusted at the OFF-set target height $H_P$. When the vehicular height indicative signal value is equal to the OFF-set target height $H_P$, a timer is triggered to measure an elapsed time after setting of the vehicular height at the OFF-set target height $H_P$. The timer value is checked against a timer reference representative of the given OFF-set period, at a step 1012. The steps 1010 and 1012 are repeated until the given period of time expires. When "TIME-UP" is detected at the step 1012, the self-holding control signal is switched from LOW level to HIGH level to shut the power supply, at a step 1014. After the step 1016, the process goes to END.

It should be appreciated that the height control to be performed by the microprocessor at the step 1006 will incorporate various control parameters in addition to the vehicular height. Practical height control processes employing various height control parameters have been disclosed in the patents and co-pending applications, listed herebelow. The disclosure of the below-listed references are herein incorporated by reference.

U.S. Pat. No. 4,519,169
European Patent First Publication 01 14 680
European Patent First Publication 01 14 700
U.S. Pat. No. 4,659,104
U.S. Pat. No. 4,718,695
U.S. Ser. No. 906,239, filed on Sept. 12, 1986
U.S. Ser. No. 056,761, filed on June 2, 1987
German Patent First Publication 37 15 441
U.S. Ser. No. 120, 964, filed on Nov. 16, 1987

As will be appreciated herefrom since the vehicular height during parking condition, is held at a higher level than during normal driving conditions, necessity of height adjustment upon ON-set of power supply can be reduced. This improves riding comfort of the vehicle and expands life of the compressor.

Therefore, the invention fulfills all of the objects and advantages sought therefor.

What is claimed is:

1. A height control system for an automotive suspension system, comprising:

a suspension system disposed between a vehicle body and a suspension member rotatably supporting a road wheel, said suspension system including means for varying suspension force to be exerted between said vehicle body and said suspension member;

a sensor monitoring a relative distance between said vehicle body and said suspension member for producing a height indicative sensor signal; and a controlling means, connected to an electric power source, for receiving said sensor signal, and checking the value of said sensor signal with respect to a predetermined value for deriving a control signal to operate said varying means to adjust said suspension force for maintaining said relative distance between said vehicle body and said suspension member, said controlling means being responsive to turning OFF of a power supply switch interposed between said electric power source and said controlling means, for increasing said predetermined value by a given magnitude to perform suspension control for a given period of time to control said relative distance at a height corresponding to the increased predetermined value.

2. A height control system as set forth in claim 1, wherein said controlling means maintains operation for said given period of time after said distance is adjusted at said increased predetermined value corresponding height.

3. A height control system as set forth in claim 2, wherein said varying means comprises a hollow chamber communicated with a working fluid source to introduce and discharge working fluid in said hollow chamber for adjusting pressure of working fluid in said hollow chamber, which fluid pressure serves as said suspension force, and a pressure control valve disposed between said working fluid source and said hollow chamber for controlling introduction and discharging of working fluid into and from said hollow chamber for adjusting said suspension force and thereby adjusting said relative distance.

4. A height control system as set forth in claim 1, which further comprises an auxiliary power supply circuit by-passing said power supply switch, which includes a switching means operable between ON and OFF for establishing and blocking electrical communication through said auxiliary power supply circuit, the switch position of said switching means controlled by said controlling means.

5. A height control system as set forth in claim 4, wherein said controlling means maintains said switching means at ON state for maintaining electrical communication for said given period of time.

6. A height control system as set forth in claim 5, wherein said varying means comprises a hollow chamber communicated with a working fluid source to introduce and discharge working fluid in said hollow chamber for adjusting pressure of working fluid in said hollow chamber, which fluid pressure serves as said suspension force, and a pressure control valve disposed between said working fluid source and said hollow chamber for controlling introduction and discharging of working fluid into and from said hollow chamber for adjusting said suspension force and thereby adjusting said relative distance.

7. A height control system for an automotive suspension system, comprising:

a suspension system disposed between a vehicle body and a suspension member rotatably supporting a road wheel, said suspension system including means for varying suspension force to be exerted between said vehicle body and said suspension member;

a sensor monitoring a relative distance between said vehicle body and said suspension member for producing a height indicative sensor signal; and a controlling means, connected to an electric power source, for receiving said sensor signal, and checking the value of said sensor signal with respect to a predetermined first target height value for deriving a control signal to operate said varying means to adjust said suspension force for maintaining said relative distance between said vehicle body and said suspension member, said controlling means being responsive to turning OFF of a power supply switch interposed between said electric power source and said controlling means, for setting a second target height value which is greater than said first target height value in a given magnitude to perform suspension control for a given period of time to adjust said relative distance at said second target height.

8. A height control system as set forth in claim 7, wherein said controlling means maintains operation for said given period of time after said distance is adjusted at said increased predetermined value corresponding height.

9. A height control system as set forth in claim 8, wherein said varying means comprises a hollow chamber communicated with a working fluid source to introduce and discharge working fluid in said hollow chamber for adjusting pressure of working fluid in said hollow chamber, which fluid pressure serves as said suspension force, and a pressure control valve disposed between said working fluid source and said hollow chamber for controlling introduction and discharging of working fluid into and from said hollow chamber for adjusting said suspension force and thereby adjusting said relative distance.

10. A height control system as set forth in claim 7, which further comprises an auxiliary power supply circuit by-passing said power supply switch, which includes a switching means operable between ON and OFF for establishing and blocking electrical communication through said auxiliary power supply circuit, the switch position of said switching means controlled by said controlling means.

11. A height control system as set forth in claim 10, wherein said controlling means maintains said switching means at ON state for maintaining electrical coimmunication for said given period of time.

12. A height control system for an automotive suspension system, comprising:

a suspension system disposed between a vehicle body and a suspension member rotatably supporting a road wheel, said suspension system including means for varying suspension force to be exerted between said vehicle body and said suspension member;

a sensor monitoring a relative distance between said vehicle body and said suspension member for producing a height indicative sensor signal;

a power source means including an ignition switch operable between ON and OFF to establish and block a main power supply; and a controlling means, connected to an electric power source, for receiving said sensor signal, and checking the value of said sensor signal with respect to a predetermined first target height value for deriving a control signal to operate said varying means to adjust said suspension force for maintaining said relative distance between said vehicle body and said suspension member, said controlling means being responsive to turning OFF of said ignition switch for setting a second target height value which is greater than said first target height value in a given magnitude to perform suspension control for a given period of time to adjust said relative distance at said second target height.

13. A height control system as set forth in claim 12, wherein said controlling means maintains operation for said given period of time after said distance is adjusted at said increased predetermined value corresponding height.

14. A height control system as set forth in claim 13, wherein said varying means comprises a hollow chamber communicated with a working fluid source to introduce and discharge working fluid in said hollow chamber for adjusting pressure of working fluid in said hollow chamber, which fluid pressure serves as said suspension force, and a pressure control valve disposed between said working fluid source and said hollow chamber for controlling introduction and discharging of working fluid into and from said hollow chamber for adjusting said suspension force and thereby adjusting said relative distance.

15. A height control system as set forth in claim 14, which further comprises an auxiliary power supply circuit by-passing said ignition switch, which includes a switching means operable between ON and OFF for establishing and blocking electrical communication through said auxiliary power supply circuit, the switch position of said switching means controlled by said controlling means.

16. A height control system as set forth in claim 15, wherein said controlling means maintains said switching means at ON state for maintaining electrical communication for said given period of time.

17. A height control system for an automotive suspension system, comprising:
  a suspension system disposed between a vehicle body and a suspension member rotatably supporting a road wheel, said suspension system including means for varying a suspension force to be exerted between said vehicle body and said suspension member;
  a sensor for monitoring a relative distance between said vehicle body and said suspension member for producing a height indicative sensor signal;
  a power supply means for supplying electric power, said power supply means having an on state and an off state;
  a switching means for commanding said power supply means to assume said on state or said off state;
  means for holding said power supply means in said on state for a predetermined period of time after said switching means commands said power supply means to assume said off state; and
  a controlling means connected to said power supply means for receiving said sensor signal and checking the value of said sensor signal with respect to a predetermined value for deriving a control signal to operate said varying means to adjust said suspension force for maintaining said relative distance between said vehicle body and said suspension member, said controlling means being responsive to said switching means commanding said power supply means to be in said off state for increasing said predetermined value by a given magnitude to perform suspension control to product a larger relative distance within said period of time.

* * * * *